United States Patent
Philippe et al.

(10) Patent No.: US 10,384,486 B2
(45) Date of Patent: Aug. 20, 2019

(54) METHOD FOR THE PRODUCTION OF A MULTI-LAYER DATA MEDIUM WITH SECURITY INSCRIPTIONS

(71) Applicant: FASVER, Baillargues (FR)

(72) Inventors: Eric Philippe, Eyguieres (FR); Didier Alberny-Sicard, Montpellier (FR)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 15/314,684

(22) PCT Filed: Jun. 12, 2015

(86) PCT No.: PCT/EP2015/063178
§ 371 (c)(1),
(2) Date: Nov. 29, 2016

(87) PCT Pub. No.: WO2015/189392
PCT Pub. Date: Dec. 17, 2015

(65) Prior Publication Data
US 2017/0190205 A1 Jul. 6, 2017

(30) Foreign Application Priority Data
Jun. 13, 2014 (FR) ...................................... 14 55414

(51) Int. Cl.
*B42D 25/324* (2014.01)
*B42D 25/351* (2014.01)
(Continued)

(52) U.S. Cl.
CPC ............ *B42D 25/324* (2014.10); *B32B 27/08* (2013.01); *B32B 27/304* (2013.01); *B32B 27/36* (2013.01);
(Continued)

(58) Field of Classification Search
CPC .. B42D 25/324; B42D 25/328; B42D 25/373; B42D 25/364; B42D 25/425; B42D 25/46; B42D 25/455; B32B 27/36; B32B 27/08; B32B 37/185; B32B 38/06; B32B 37/10; B32B 27/304; B32B 27/365;
(Continued)

(56) References Cited

U.S. PATENT DOCUMENTS

2009/0236034 A1 9/2009 Leroy et al.
2010/0025477 A1* 2/2010 Deloche .......... G06K 19/07749
235/488

FOREIGN PATENT DOCUMENTS

| FR | 2 763 889 A1 | 12/1998 |
| FR | 2 897 556 A1 | 8/2007 |
| FR | 2 913 126 A1 | 8/2008 |

OTHER PUBLICATIONS

International Search Report, dated Sep. 1, 2015, from corresponding PCT application.

* cited by examiner

*Primary Examiner* — Justin V Lewis
(74) *Attorney, Agent, or Firm* — Levenfeld Pearlstein, LLC

(57) ABSTRACT

Disclosed is a method for the production of a multi-layer data medium by the hot rolling under pressure of a plurality of superimposed layers (12) having security inscriptions. Marking rolling is carried out on at least one layer to be marked (12a) covered with a marking film (20, 21) bearing inscriptions (22) in vitrophany applied in contact with the layer to be marked, then the marking film is separated from the layer to be marked, the latter having the security inscriptions.

18 Claims, 3 Drawing Sheets

Figure 1:
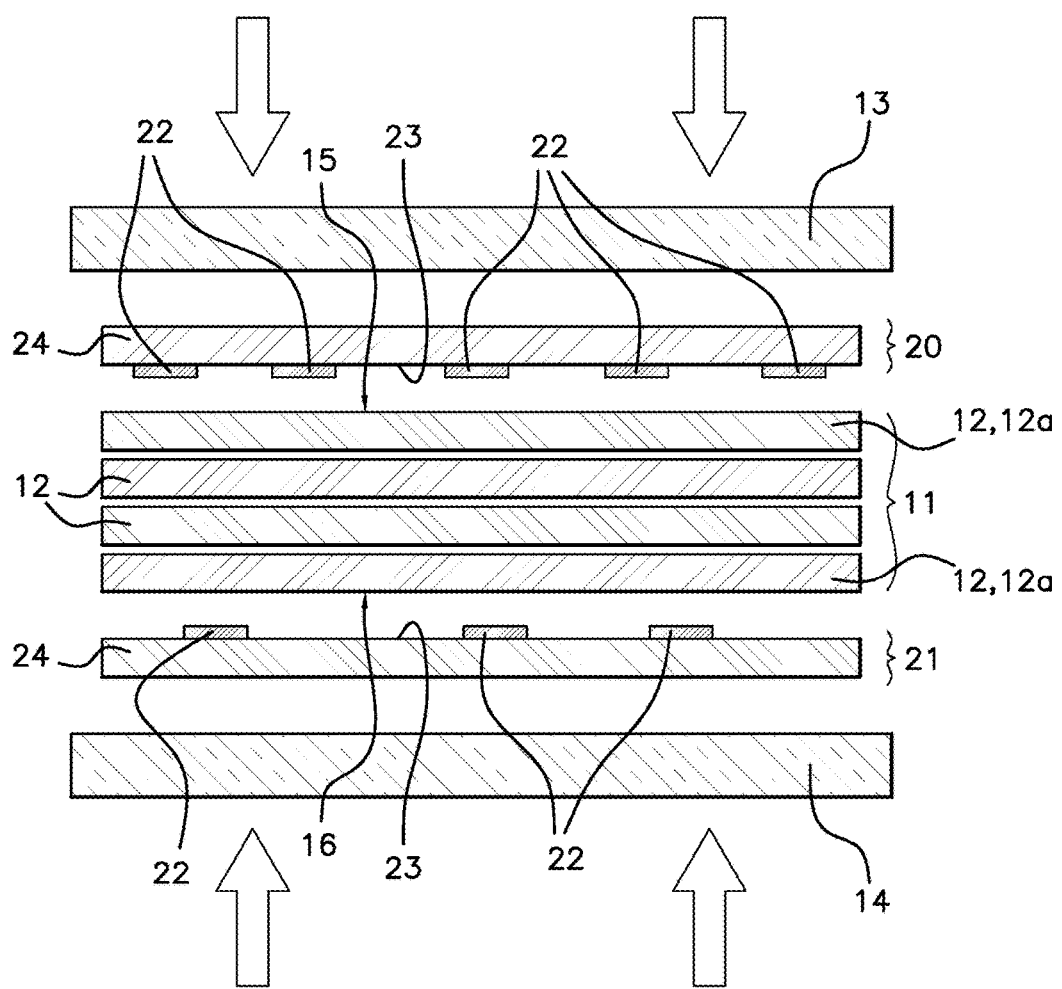

(51) Int. Cl.
- B41M 3/14 (2006.01)
- B41M 5/24 (2006.01)
- B42D 25/455 (2014.01)
- B42D 25/46 (2014.01)
- B32B 37/18 (2006.01)
- B32B 38/06 (2006.01)
- B32B 27/08 (2006.01)
- B32B 27/30 (2006.01)
- B32B 27/36 (2006.01)
- B42D 25/328 (2014.01)
- B42D 25/364 (2014.01)
- B42D 25/373 (2014.01)
- B42D 25/425 (2014.01)
- B32B 37/10 (2006.01)

(52) U.S. Cl.
CPC .......... *B32B 27/365* (2013.01); *B32B 37/10* (2013.01); *B32B 37/185* (2013.01); *B32B 38/06* (2013.01); *B41M 3/144* (2013.01); *B41M 3/148* (2013.01); *B41M 5/24* (2013.01); *B42D 25/328* (2014.10); *B42D 25/351* (2014.10); *B42D 25/364* (2014.10); *B42D 25/373* (2014.10); *B42D 25/425* (2014.10); *B42D 25/455* (2014.10); *B42D 25/46* (2014.10); *B32B 2307/4026* (2013.01); *B32B 2307/412* (2013.01); *B32B 2307/75* (2013.01); *B32B 2309/025* (2013.01); *B32B 2309/105* (2013.01); *B32B 2309/125* (2013.01); *B32B 2425/00* (2013.01)

(58) Field of Classification Search
CPC .......... B32B 2425/00; B32B 2307/412; B32B 2307/4026; B41M 3/144; B41M 5/24; B41M 3/148

USPC .................. 283/67, 70, 72, 94, 98, 107
See application file for complete search history.

METHOD FOR THE PRODUCTION OF A MULTI-LAYER DATA MEDIUM WITH SECURITY INSCRIPTIONS

The invention relates to a method for the production of a multi-layer data medium by hot rolling under pressure of a plurality of superimposed layers comprising at least one outer layer of a least one thermoplastic material, said multi-layer data medium having inscriptions, named security inscriptions. It relates to the multi-layer data medium thus obtained, to the use thereof for the production of an official document, and to an official document thus obtained.

Official documents are documents which, by reason of their nature and/or the rights which they can confer, must be protected against attempted forgery and/or counterfeiting and/or to guarantee authentication and/or to guarantee the integrity thereof (i.e. the fact that they have not been tampered with or modified). These documents can be in particular passports, visas, identity cards, driving licences, logbooks, loyalty cards, bank cards, bank cheques, diplomas, certificates, transport documentation, access control cards, badges, labels, legal documents, contracts, legal registers, land registry documents, trust documents, bank notes, manufacturing drawings or other drawings . . . . Official documents have inscriptions, such as variable personalising details (first name, surname, address, photo, signature . . . of a holder or parties . . . ) and/or common details (security patterns, character boxes, borders, field names, seals, holograms, signatures, values, . . . ).

Throughout the text, the term "visible" designates any electromagnetic radiation of which the spectral composition is within the wavelength spectrum visible to the human eye, i.e. within wavelengths between 400 nm and 800 nm. Throughout the text, "short-wave ultraviolet" designates any light radiation of a wavelength of less than 300 nm—in particular of the order of 250 nm. Throughout the text, "long-wave ultraviolet" designates any non-visible light radiation of a wavelength of more than 300 nm—in particular of less than 400 nm, and especially of the order of 365 nm.

Throughout the text, "inscription" designates any sign or pattern produced on a layer of a document able to be read by a human and/or a machine (OCR), at least under certain conditions (in particular under normal lighting with visible light; and/or under specific lighting; and/or after activation of an electronic device (screen) or the like . . . ). This may include in particular variable personalising details (first name, civil status, photograph, value, dates . . . ) of a official document or common and/or security details; texts (manually written or imprinted characters); codes (ASCII, universal codes which are read optoelectronically such as bar codes . . . ); drawings, images or photographs; spots or blocks of colour . . . . Official documents generally contain inscriptions, named security inscriptions, to render reproduction or forgery thereof impossible or extremely complex. These security inscriptions can be of the type which are visible in the visible range by simply looking with the naked eye (first-level security); or of the type which can be checked using a specific device such as an ultraviolet lamp (second-level security); or of the type which can be checked only in a certified laboratory (third-level security).

Throughout the text, a surface is said to be glossy when it has a glossiness under white light at 85 degrees (angle of incidence of the light), e.g. measured using the gloss meter BYK GARDNER, of greater than 50%; a surface is said to be non-glossy when it has a glossiness under white light at 85 degrees of less than 50%; a surface is said to be matt when it has a glossiness under white light at 85 degrees of less than 30%. In the case of layers produced by imprinting, in particular by screen printing or flexography, the glossiness is linked to the surface condition. Thus a surface is glossier when its surface condition is less rough. The glossiness and mattness of a surface can thus also be evaluated by measuring roughness.

Throughout the text, "transfer" designates any operation consisting of applying to a surface at least one pattern borne by a film and transferring each pattern to the surface by contact of the film and of each pattern on the surface and adhesion of each pattern on the surface, then separation of the film with respect to each pattern and to the surface. A pattern able to be used for such a transfer operation is designated a "transferable" pattern.

Throughout the text, "optically variable effect" designates any inscription producing optical appearances—particularly but not exclusively in the visible range—(e.g. different colours or different tones) which vary depending on the directions of observation of this marking. In particular, this may relate to inscriptions produced with iridescent and/or interferential pigments, or with liquid crystal inks or the like.

Throughout the text, "paper" designates any sheet obtained by a wet method using a suspension of natural cellulose fibres and/or mineral fibres and/or vegetable fibres and/or polymeric synthetic fibres other than cellulose, able to contain various fillers and additives such as are used in paper-making. The term "synthetic paper" designates any paper comprising polymeric synthetic fibres other than cellulose.

Throughout the text, "relief" designates any shape extending in a protruding or a recessed manner with respect to a surface.

Throughout the text, "varnish" designates any solid cured composition resulting from a curable liquid composition; this term thus includes traditional varnishes which cure in air or otherwise (ultraviolet-curing, polymerisation . . . ), inks, lacquers, paints, resins . . . . "Varnish composition" designates any curable and imprintable liquid composition which permits a varnish to be obtained after curing. "Imprinting" designates any method of application of a composition in the curable liquid condition (i.e. permitting a varnish to be obtained), in particular a liquid ink, or of a dry ink, to a surface of a solid substrate.

Throughout the text, the expression "at least substantially" indicates, in a conventional manner, that a structural or functional feature should not be understood to be marking a sudden discontinuity, which would have no physical sense, but covers not only this structure or this function but also slight variations in this structure or this function which, in the technical context in question, produce an effect of the same nature if not of the same degree. Moreover, the expressions "including/comprising a/one" are synonyms for "including/comprising at least one".

Numerous official documents such as bank cards, identity cards, driving licences, cards for individual access to sites or public transport, passport pages, customs documents, visas, trust documents, bank notes . . . are formed of multi-layer data media obtained by hot rolling (temperature typically of the order of 150° C. to 200° C.) under pressure (typically of the order of $10^6$ Pa to $2.10^6$ Pa) of a plurality of layers of thermoplastic material—in particular of polycarbonate, a material also having numerous advantages in these applications (rigidity, durability, easy and reliable marking (variable inscriptions, security patterns . . . ), option to produce markings by laser radiation . . . ).

From an industrial point of view, it is important to be able to produce these data media in large batches, incorporating therein all the security inscriptions at the time of hot rolling under pressure and avoiding multiple successive steps and the use of complex, expensive tooling. However, the possibilities offered with respect to the security inscriptions with the data media produced by hot rolling under pressure are limited by a number of constraints:

when the security inscriptions are produced before hot rolling under pressure they must themselves be resistant to said hot rolling under pressure and not affect the result thereof;

it is possible to produce some security inscriptions during hot rolling under pressure, by using suitable punching and/or embossing plates; but apart from the fact that this is possible only for certain types of security inscriptions, this option requires the extremely costly production of plates specific to each series of security inscriptions to be produced; furthermore, the patterns able to be produced are relatively crude and thus easily reproduced by counterfeiters.

In particular, security inscriptions such as relief patterns having different levels of glossiness; holographic patterns; metallised varnish patterns; or patterns which are photoluminescent under light radiation outside the visible range cannot currently be integrated with multi-layer data media made of thermoplastic material by hot rolling under pressure under economic conditions compatible with an operation on an industrial scale.

More particularly it is not known how to incorporate patterns which are invisible under illumination with visible light and photoluminescent under illumination with short-wave ultraviolet light into multi-layer data media made of thermoplastic material by hot rolling under pressure. In fact, the thermoplastic materials constituting the multi-layer data media such as polycarbonate or PVC are not transparent to short-wave ultraviolet light, and simple imprinting, e.g. by screen printing, of such photoluminescent patterns on the surface of a multi-layer data medium does not achieve sufficient resistance to mechanical attack (the patterns easily being removed by simple abrasion). Similarly, it is not known how, by imprinting an ink on the surface of a multi-layer data medium, to apply reflecting metallised patterns which are sufficiently resistant to mechanical attack.

In this context, the invention thus aims generally to propose a production method enabling various security inscriptions to be incorporated into a multi-layer data medium made of thermoplastic material which is hot rolled under pressure, including relief patterns having different levels of glossiness; holographic patterns; metallised varnish and/or reflecting-effect (mirror) patterns; patterns which are photoluminescent under illumination by light radiation outside the visible range—in particular patterns which are photoluminescent under illumination by short-wave ultraviolet light, and to do so within economic conditions compatible with an operation on an industrial scale.

The invention also aims to propose such a production method which is compatible with methods for hot rolling under pressure of such data media, which does not necessitate the production of specific complex tooling and does not impose numerous additional processing steps before or after the hot rolling under pressure of the different constituent layers of the data media.

For this purpose, the invention relates to a method for the production of a multi-layer data medium by hot rolling under pressure of a plurality of superimposed layers comprising at least one outer layer of a least one thermoplastic material, said multi-layer data medium having inscriptions, named security inscriptions, characterised in that:

at least one marking film is selected:
suitable to being subjected to hot rolling under pressure, named marking rolling, with a layer, named layer to be marked, of thermoplastic material of said plurality of superimposed layers forming the data medium, said layer to be marked being covered with the marking film during said marking rolling,
comprising a surface, named contact surface, bearing inscriptions in vitrophany corresponding to said security inscriptions and being suitable for marking said layer to be marked following marking rolling of the marking film and of said layer to be marked, said contact surface and said inscriptions in vitrophany being in contact with said layer to be marked,
suitable for being separated from said layer to be marked after marking rolling, the security inscriptions being formed on said layer to be marked,
marking rolling of at least one layer to be marked covered with such a marking film is carried out, said inscriptions in vitrophany being in contact with said layer to be marked,
the marking film is then separated from said layer to be marked, the latter having said security inscriptions.

While a method of hot rolling under pressure of a plurality of layers of which at least a part is formed of at least one thermoplastic material is considered as necessarily causing a perfect fusion of the different thermoplastic layers to one another, which constitutes its principal advantage, the inventors have unexpectedly discovered that it is possible to provide a marking film which can be superimposed on such a thermoplastic layer and be subjected to marking rolling with at least this thermoplastic layer, then to separation of this thermoplastic layer in order to permit marking on this layer to be carried out, marking which permits the incorporation of various security inscriptions in a multi-layer data medium hot rolled under pressure.

Even more unexpectedly, the inventors have discovered that it is possible to incorporate such a separable marking film as an outermost layer of the stack of said plurality of superimposed thermoplastic layers to which the hot rolling under pressure is applied in order to produce the multi-layer data medium. Thus, a method according to one variation of the invention is also advantageously characterised in that the layer to be marked is an outermost layer of said plurality of superimposed layers, which is intended to form a free outermost surface of the multi-layer data medium, and in that said marking rolling is said hot rolling under pressure of said plurality of superimposed layers, the marking film being placed in contact with the layer to be marked during this hot rolling under pressure, said free outermost surface of the medium bearing said security inscriptions after said hot rolling under pressure.

Of course, there is nothing to prevent several marking films being used to produce a single multi-layer data medium, e.g. a marking film for marking each outermost layer forming the free surfaces of the multi-layer data medium and/or a marking film for incorporating security inscriptions on a layer to be marked placed within the thickness of the multi-layer data medium. However, in this latter variation, the marking rolling must be effected before said hot rolling under pressure of said plurality of superimposed layers permitting the multi-layer data medium to be obtained, the layer to be marked having undergone the marking rolling and thus bearing security inscriptions, then being incorporated into the stack used to carry out said hot rolling under pressure of the different superimposed layers constituting the multi-layer data medium.

Thus, in one variation of the invention which can be combined with the preceding one, marking rolling is carried out before said hot rolling under pressure of said plurality of superimposed layers, the layer to be marked being marked with said security inscriptions and integrated in said plurality of superimposed layers before said hot rolling under pressure of said plurality of superimposed layers is carried out.

The marking film can appear in many variations as long as the criteria mentioned above are met, i.e. on the one hand it resists marking rolling of the layer to be marked and on the other hand it can bear inscriptions in vitrophany permitting inscriptions to be incorporated on said layer to be marked, and it can then be separated from this layer to be marked after marking rolling. This marking film is selected to be of a suitable material depending on that constituting the layer to be marked. Furthermore, it is also selected so as to permit the production of the inscriptions in vitrophany on the marking film in a simple and economical manner, e.g. by imprinting at least one layer of varnish and/or of ink, in particular by screen printing or flexography or the like.

In some advantageous embodiments in accordance with the invention, a marking film such as this is used to produce relief patterns (indentations) as security inscriptions. Thus, in an advantageous manner and in accordance with the invention, a marking film is selected having, as inscriptions in vitrophany, relief patterns in vitrophany corresponding to security inscriptions formed of relief patterns.

A marking film of this type having embossed relief patterns in vitrophany can be produced in different ways, in particular by laser etching, embossing, imprinting with a varnish composition . . . . Advantageously and in accordance with the invention, a marking film is selected having a surface, named contact surface, bearing said relief patterns in vitrophany formed by imprinting of a varnish on the contact surface, said contact surface and said varnish being selected so that said relief patterns in vitrophany remain fixedly attached to the marking film after marking rolling and separation of the marking film and said layer to be marked. Thus, the material constituting the marking film and that of the varnish composition used to produce embossed relief patterns in vitrophany are selected so that these embossed relief patterns in vitrophany remain fixedly attached to the marking film. In particular, in an advantageous manner and in accordance with the invention, said imprinting of varnish with an ultraviolet-drying varnish composition comprising at least one agent promoting adhesion of the varnish to said contact surface is carried out.

Furthermore, in an advantageous manner and in accordance with the invention, the relief patterns in vitrophany are selected from among relief patterns imprinted on the contact surface with said varnish, and relief patterns embossed on the surface of a layer of said varnish imprinted on the contact surface.

A marking film with such embossed relief patterns in vitrophany is a punching (or stamping) film which can be used to produce different types of security inscriptions and in particular inscriptions having different levels of glossiness (allowing reproduction by optical reader to be prevented) e.g. with relief patterns formed of a glossy varnish imprinted on the matt contact surface of a marking film, or with relief patterns formed of a matt varnish imprinted on the glossy contact surface of a marking film, or a glossy varnish imprinted as a block of colour on the contact surface of the marking film and in which matt indentations are embossed, or a matt varnish imprinted as a block of colour on the contact surface of the marking film and in which glossy indentations are embossed . . . . Thus, in an advantageous manner and in accordance with the invention, the relief patterns in vitrophany are selected from among relief patterns having at least two different surface conditions respectively corresponding to at least two different glossiness values of said security inscriptions, and relief patterns in vitrophany suitable for forming at least one holographic pattern.

A marking film with such relief patterns in vitrophany can also be used to form at least one holographic pattern. Thus, in an advantageous manner and in accordance with the invention, a marking film is selected, having, as inscriptions in vitrophany, at least one imprint of varnish suitable for being transferred by said marking rolling to said layer to be marked, said transferred inscriptions in vitrophany constituting said security inscriptions.

Thus, with a separable marking film such as this, provided with relief patterns in vitrophany, it proves in particular to be possible, in a single step, on the one hand to carry out the hot rolling under pressure of the different constituent layers of the multi-layer data medium and on the other hand to form security inscriptions formed by relief patterns and/or having different levels of glossiness and/or holographic patterns on at least one of the free outermost surfaces of this multi-layer data medium.

In these variations, in an advantageous manner and in accordance with the invention, said marking film can be formed of a polyester film covered with a layer suitable for being embossed (e.g. by rolling through one or several holographic or non-holographic stamping cylinder(s)) to form holographic or non-holographic relief patterns, this layer being a constituent of the marking film (i.e. associated with the polyester film in continuous production) or applied by imprinting as a block of colour on such a polyester film. In particular, it is possible to use directly, as a marking film, a pre-produced film which can be stamped, e.g. a film such as sold under the name "UV cast" by the company ITW Covid Security Group Inc. (Cranbury, USA). In particular, it proves to be the case that such polyester films or "UV cast" meet the above-mentioned criteria in respect of the marking film. They are particularly advantageous when the layer to be marked is a layer of polycarbonate or of PVC.

Thus, in an advantageous manner and in accordance with the invention, each layer of said plurality of superimposed layers is formed of at least one thermoplastic material selected from the group of polycarbonates, PVCs, synthetic papers, mixtures and associations thereof, and a marking film made of polyester is selected. Of course, other variations are possible.

Furthermore, in some embodiments of the invention, a marking film is used to produce security inscriptions by transfer of said inscriptions in vitrophany to the layer to be marked during said marking rolling, in particular during said hot rolling under pressure of said plurality of superimposed layers, permitting the multi-layer data medium to be produced. Thus, in an advantageous manner and in accordance with the invention, a marking film is selected, having, as inscriptions in vitrophany, at least one imprint of varnish suitable for being transferred by said marking rolling to said layer to be marked, said transferred inscriptions in vitrophany constituting said security inscriptions.

In a totally unexpected way, it actually proves to be the case on the one hand that it is possible to transfer inscriptions borne initially by a marking film to said layer to be marked, i.e. to a layer of said plurality of superimposed layers, and to do so either during a previous step of marking-rolling of at least one layer to be marked, or even during said hot rolling under pressure of this plurality of layers, and on the other hand that these inscriptions thus transferred are of excellent quality and have a high level of resistance to mechanical attack, in particular abrasion, the transferred varnish being incorporated over a certain depth into the thickness of the layer to be marked.

Thus, it is possible, in particular in a single step, to carry out not only the hot rolling under pressure of the different constituent layers of the multi-layer data medium but also, by a simple transfer process, security inscriptions to at least one of the free outermost surfaces of this multi-layer data medium.

In an unexpected manner, the inventors have discovered that this variation of a method in accordance with the invention in a single step makes it possible in particular to form, on a multi-layer data medium, security inscriptions which are photoluminescent under short-wave ultraviolet illumination and which are resistant to abrasion.

More generally, the security inscriptions thus formed with such a marking film can in particular be selected from the group formed by photoluminescent patterns, fluorescent patterns, photochromic patterns, thermochromic patterns, optically variable (iridescent, interferential or other) patterns, soluble dye patterns, soluble binder patterns, holographic patterns and metallised and/or reflecting patterns (i.e. patterns formed of at least one impression of an ink producing a metallic and/or reflecting effect and/or incorporating metallic particles and/or a coloured or non-coloured metallic layer).

In particular, security inscriptions thus formed by transfer can especially be inscriptions which are photoluminescent under illumination by light radiation outside the visible range—particularly inscriptions which are photoluminescent under illumination by ultraviolet light, especially short-wave ultraviolet light. Such photoluminescent inscriptions can advantageously be at least substantially invisible under illumination in the visible range.

Thus, in an advantageous manner and in accordance with the invention at least one varnish impression is selected from among an impression with a metallised varnish and impression with a varnish which is photoluminescent under illumination with light radiation outside the visible range—in particular under ultraviolet light, especially under short-wave ultraviolet light.

Security inscriptions thus formed by transfer can also in particular be reflecting metallised inscriptions which also have the unexpected feature of excellent transfer to the layer to be marked.

Thus, in an advantageous manner and in accordance with the invention at least one varnish impression is produced with a reflecting metallised ink composition.

It should be noted that the different variations of the invention can be combined. In particular, it is possible to use a single marking film comprising embossed relief patterns in vitrophany and transferable varnish inscriptions, this marking film constituting both a punching film and a transfer film.

The invention relates to a multi-layer data medium having inscriptions, named security inscriptions, formed of a plurality of superimposed layers rolled with respect to each other and comprising at least one outer layer of at least one thermoplastic material, characterised in that it is produced by a method in accordance with the invention. In particular, the invention relates to a multi-layer data medium, able to be obtained by a method in accordance with the invention, having inscriptions, named security inscriptions, formed of a plurality of superimposed layers rolled with respect to each other, comprising at least one layer of at least one thermoplastic material, characterised in that it comprises security inscriptions selected from among relief patterns of different levels of glossiness; holographic patterns; metallised and/or reflecting patterns; and patterns which are photoluminescent under illumination by light radiation outside the visible range—in particular under ultraviolet light, especially short-wave ultraviolet light. In particular, the invention relates to a multi-layer data medium made of thermoplastic material. In particular, the invention relates to a multi-layer data medium in which each layer of said plurality of superimposed layers is formed of at least one thermoplastic material selected from the group of polycarbonates.

In an advantageous manner and in accordance with the invention, each layer of said plurality of superimposed layers is formed of at least one thermoplastic material selected from the group of polycarbonates, PVCs, synthetic papers, mixtures and associations thereof (passport covers, for example).

Furthermore, a data medium according to certain embodiments of the invention advantageously has security inscriptions formed on at least one of its free outer surfaces.

The invention also relates to an official document comprising at least one multi-layer data medium in accordance with the invention. An official document in accordance with the invention can in particular be selected from the group formed by passports, passport pages, customs documents, visas, identity cards, driving licences, vehicle registration cards (logbooks), bank cards, loyalty cards, bank cheques, diplomas, certificates, transport documentation, access control cards, badges, labels, legal documents, contracts, legal registers, land registry documents, trust documents, bank notes, packages and manufacturing drawings.

The invention also relates to a production method, a multi-layer data medium and an official document, which are characterised in combination by all or some of the features mentioned above or below.

Figure 2:
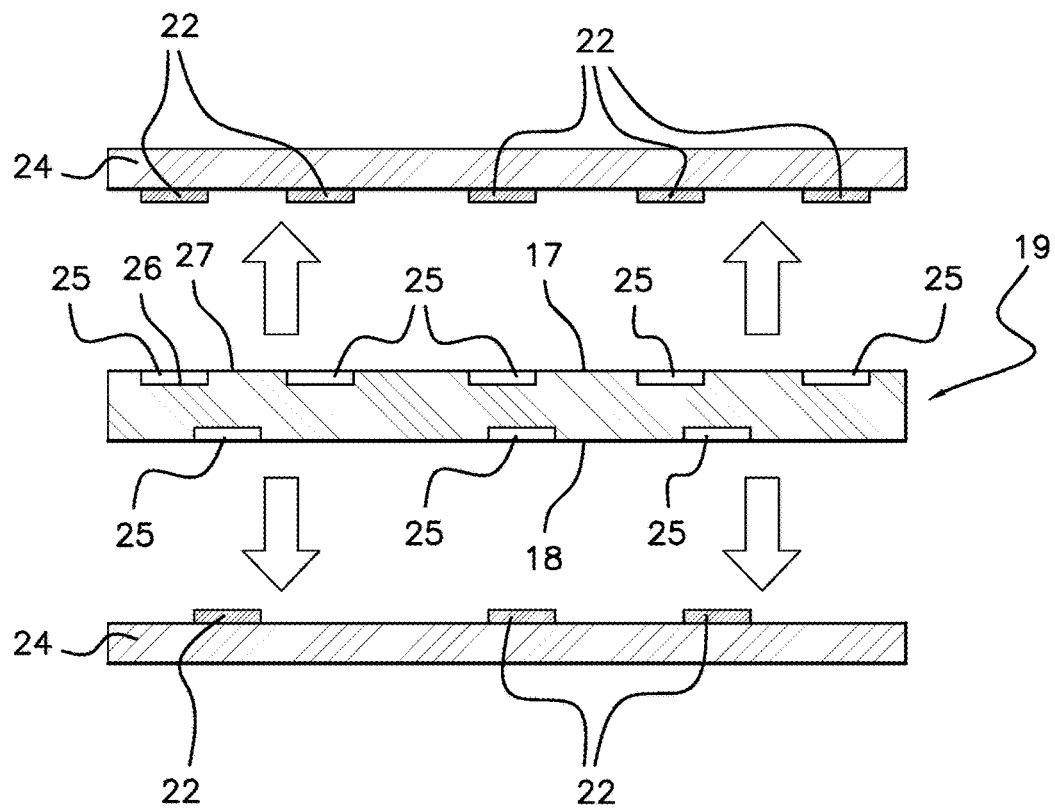
Figure 3:
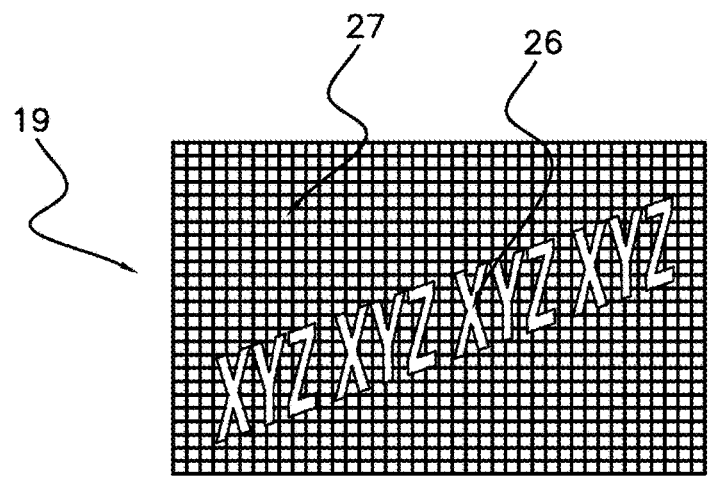
Figure 4:
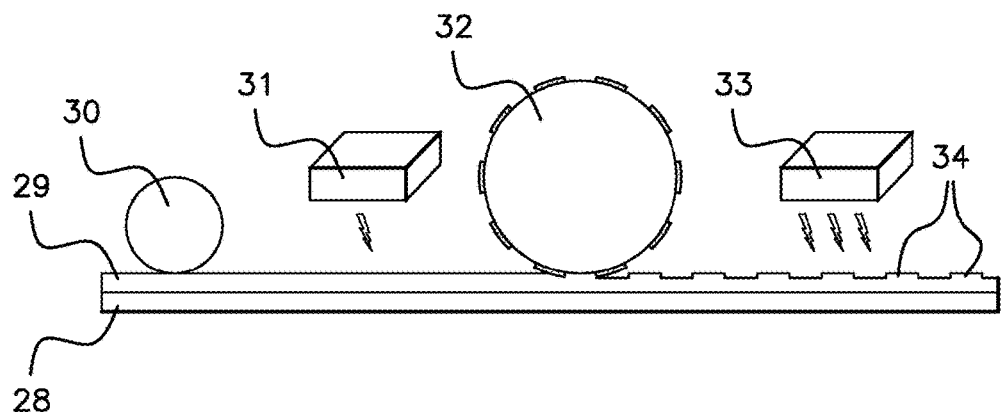
Figure 5:
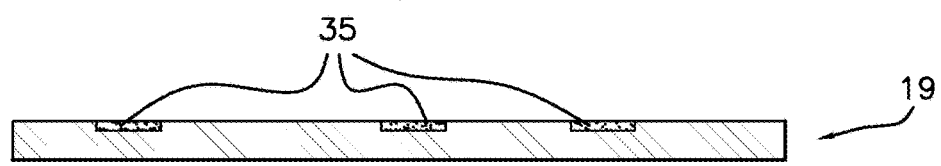
Figure 6:
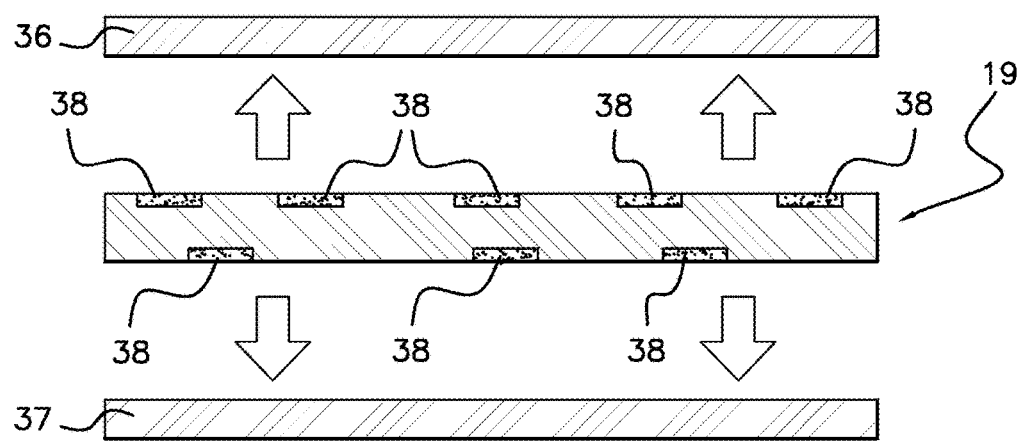

Other aims, features and advantages of the invention will become apparent upon reading the following description given by way of non-limiting example and which makes reference to the attached figures in which:

FIG. 1 is a diagram illustrating in cross-section a step of hot rolling under pressure of a stack of layers in a method in accordance with the invention, FIG. 2 is a diagram illustrating in cross-section a step of separating the marking film of a method in accordance with one variation of the invention, FIG. 3 is a diagram in plan view illustrating an example of a data medium in accordance with the invention provided with security inscriptions having different levels of glossiness, FIG. 4 is a diagram illustrating a variation of producing a marking film able to be used in a method in accordance with the invention, FIG. 5 is a diagram in cross-section illustrating an example of a data medium in accordance with the invention provided with holographic security inscriptions, FIG. 6 is a diagram illustrating in cross-section a step of separating the marking film of a method in accordance with the invention.

In the figures, for the sake of illustration, the relative scales and dimensions have not been respected. In particular, the thicknesses are shown in an exaggerated fashion.

FIG. 1 illustrates an example of hot rolling under pressure of a stack 11 formed of a plurality of superimposed layers 12 of thermoplastic material, e.g. of polycarbonate or of PVC, four being shown in the example. The stack 11 of superimposed layers 12 has two outermost surfaces 15, 16 formed by the final layers of the stack 11 and which are intended to form, after hot rolling under pressure, the two free outer surfaces 17, 18 of the multi-layer data medium 19 obtained.

In the embodiment of FIG. 1, the method in accordance with the invention makes it possible to produce security inscriptions on these free outer surfaces 17, 18 of the multi-layer data medium 19. In order to do this, a marking film 20, 21 is applied to each of the two outermost surfaces 15, 16 respectively of these final layers, named layers to be marked 12a, of the stack 11.

Each marking film 20, 21 comprises a polyester film 24 having a surface, named contact surface 23, on which embossed relief (protruding) patterns 22 are imprinted with the aid of a varnish composition selected to be able to adhere to the contact surface 23 of the polyester film (including during subsequent separation of the marking film 20, 21), to be compatible with the conditions of hot rolling under pressure of the stack 11 subsequently implemented, and to permit the marking by embossing of the outermost surfaces 15, 16 of the layers to be marked 12a of the stack 11. In an advantageous manner, an ultraviolet-drying acrylic varnish composition is used, incorporating 1% à 10%, in particular 4 to 6% of an adhesion-promoting agent, e.g. such as sold under the reference UV290 by the company VFP (Saint Christol les Alès, France).

This marking by embossing thus produces security inscriptions which are formed of relief (recessed) patterns 25 on the free outermost surfaces 17, 18 of the multi-layer data medium 19. The embossed relief patterns 22 of the marking film 20, 21 are patterns in vitrophany (which are symmetrical as seen in a mirror) and form the reverse of relief patterns 25 constituting security inscriptions on the multi-layer data medium 19.

For example, a polyester film 24 is used, having a thickness between 36 µm and 500 µm, and embossed relief patterns 22 are produced with an ultraviolet-drying varnish composition imprinted with a thickness between 5 µm and 50 µm. The marking films 20, 21 are thus, in this embodiment, punching films forming indentations by embossing in the outermost surfaces 15, 16 of the layers 12a to be marked during the hot rolling under pressure.

These embossed relief patterns 22 are thus non-continuous i.e. they do not cover the whole of the contact surface 23 of the polyester film. It makes it possible in particular to produce relief patterns 25 having different states of glossiness. For example a polyester film 24 is used, of which the contact surface 23 is matt, and a glossy varnish composition is used, permitting the imprinting of glossy embossed relief patterns 22 on this contact surface 23.

In the method of hot rolling under pressure, the stack 11 covered with each marking film 20, 21 is placed between the plates 13, 14 of a hot rolling press, and subjected to one or a plurality of high-temperature compression step(s), e.g. under the following conditions:

- an initial duration of 1 minute to 5 minutes rising to a temperature between 150° C. and 200° C.;
- a first compression step at the temperature thus attained for a period between 5 minutes and 30 minutes under a first pressure value, e.g. between 20 N/cm$^2$ and 50 N/cm$^2$;
- a second compression step at the same temperature for a period of between 1 minute and 30 minutes under a second pressure value, e.g. between 100 N/cm$^2$ and 200 N/cm$^2$;
- a step of cooling to ambient temperature below a third pressure value, preferably greater than the second pressure value, e.g. between 150 N/cm$^2$ and 200 N/cm$^2$.

After this hot rolling under pressure of the different layers 12 making up the multi-layer data medium with the two marking films 20, 21, the two marking films 20, 21 can be separated, in particular by simple manual peeling, from the surfaces 15, 16 of the layers to be marked 12 as shown in FIG. 2. The embossed relief patterns 22 of each marking film 20, 21 remain fixedly attached to the latter.

The relief patterns 25 thus formed on the free surfaces 17, 18 of the multi-layer data medium 19 are hollow portions which correspond to the over-thickness portions of the embossed relief patterns 22 of the marking films 20, 21. These hollow portions have a bottom 26 having the same surface condition, and thus the same condition of glossiness, as these over-thickness portions, i.e. as the varnish used to imprint the embossed relief patterns 22. The other parts 27 of the free outer surfaces 17, 18 have a surface condition corresponding to that of the contact surface 23 of the marking film 20, 21. Thus, when a glossy varnish is used, imprinted on a matt contact surface 23, the bottom 26 of the hollow portions is glossy, whereas the other parts 27 are matt. If, in the reverse case, a matt varnish is used, imprinted on a glossy contact surface 23, the bottom 26 of the hollow portions will be matt, whereas the other parts 27 will be glossy.

This embodiment makes it possible in particular to obtain security inscriptions having a strong contrast between the glossy portions and the matt portions, which can be extremely fine and complex, and to do so in a simple, rapid and economical manner. Furthermore, these security inscriptions formed of relief patterns 25 achieve a tactile surface effect on the multi-layer data medium 19.

In the variation illustrated in FIG. 4, the marking films 20, 21 having embossed relief (protruding) patterns 34 are produced not by imprinting these embossed patterns directly on a contact surface of a polyester film but by embossing a varnish layer. In order to do this, a layer 29 of ultraviolet-drying varnish is imprinted (imprinting station 30) as a block of colour and in a continuous manner on a polyester film 28. This impression as a block of colour is partially cured by passing in front of a low-energy ultraviolet drying station 31. The film is then embossed by an embossing cylinder 32 producing indentations in the thickness of the varnish layer 29 thus forming the embossed relief patterns 34. The varnish is then definitively cured by passing below a second, high-energy ultraviolet drying station 33.

One example of varnish which can be used to produce the stampable varnish layer 29 is a mixture composed of 10% of a silicone polyether acrylate and of 90% of an ultraviolet-drying ink. The polyester film can be a film such as that sold under the name "UV cast" by the company ITW Covid Security Group Inc. (Cranbury, USA).

A marking film produced in this way can be used in exactly the same way as in the previous variation. However, the embossed relief patterns in vitrophany 34 can be produced with even greater fineness, e.g. with a width and a thickness between 10 µm and 30 µm, in particular of the order of 20 µm. In particular, the embossed relief patterns 34 can constitute holographic patterns in vitrophany. After hot rolling under pressure, such holographic relief patterns in vitrophany 34 produce holographic relief patterns 35

(stamped to form a recess) on the surfaces 17, 18 of the multi-layer data medium 19 as shown in FIG. 5.

In the variation illustrated in FIG. 6, marking films 36, 37 are used which are not punched films but rather transfer films, i.e. bearing inscriptions imprinted in vitrophany using a varnish composition selected so that it transfers to the layer to be marked 12a of the stack 11 during the operation of hot rolling under pressure of this stack 11 covered with the two marking films 36, 37. FIG. 6 shows only the step of separating the marking films 36, 37 by peeling. As shown, the inscriptions 38 initially borne by the marking films 36, 37 are separated from these marking films 36, 37 during peeling thereof, remain fixedly attached to the layers to be marked 12a, and are thus transferred to the free surfaces 17, 18 of the multi-layer data medium 19.

It is thus possible to form security inscriptions 38 of very diverse types, in particular inscriptions which are photoluminescent under illumination by light radiation outside the visible range and are invisible under illumination in the visible range. More particularly, it is possible to form, on the thermoplastic multi-layer data medium 19, inscriptions which are photoluminescent under short-wave ultraviolet illumination.

EXAMPLE 1

A matt polyester film 75 μm thick, treated to enhance adherence and sold under the name STABIPHANE® MTDE by the company NORMANDY COATING, (Arques la bataille, France; http://www.normandy-coating.com/fr/Les-roduits/mates.html) is screen printed (mesh size 120) with letters as shown in FIG. 3 using a composition of ultraviolet-cured varnish sold under the name UV 391, Uvibond® range by the company SERICOL (Trappes, France), mixed with 5% of an adhesion promoter sold under the name UV290 by the company VFP (Saint Christol les Alès, France).

Such a marking film is applied to each of the two surfaces of a stack of polycarbonate sheets as shown in FIG. 1, specifically: a 50 μm sheet of transparent polycarbonate; a 100 μm sheet of transparent polycarbonate; a 400 μm sheet of white polycarbonate; a 100 μm sheet of transparent polycarbonate; a 50 μm sheet of transparent polycarbonate.

The sheet assembly forming this stack is rolled in a rolling press under the following conditions:

1 min. rising to 180° C.
12 min. at 180° C. under 35 N/cm$^2$
5 min. at 180° C. under 140 N/cm$^2$
cooling to 20° C. for 17 min. under 140 N/cm$^2$.

It is then possible to separate the two marking films by manual peeling. The letters imprinted using the ultraviolet-drying varnish on the polyester film remain fixedly attached thereto. A data medium is obtained in the form of a card, the total thickness of which is equal to the sum of the thicknesses of the polycarbonate sheets used, decreased by about 10%. This data medium has, on its outer surfaces, contrasting matt and glossy patterns, the glossing patterns being recessed and corresponding to the letters, as shown in FIG. 3.

EXAMPLE 2

A holographic pattern is produced by embossing, using a holographic cylinder, of a film such as that sold under the name "UV cast" by the company ITW Covid Security Group Inc. (Cranbury, USA).

A marking film such as this is applied to each of the two surfaces of a stack of polycarbonate sheets, and the sheet assembly forming this stack is rolled in a press for hot rolling under pressure as described in Example 1.

It is then possible to separate the two marking films by manual peeling. A data medium is obtained in the form of a card, the total thickness of which is equal to the sum of the thicknesses of the polycarbonate sheets used, decreased by about 10%. This data medium has holographic patterns on the outer surfaces thereof as illustrated in FIG. 5.

EXAMPLE 3

A glossy polyester film 100 μm thick, sold under the name HA1000710X10 (MC) by the company TECNIFILM (Valence, France; www.technifilm.com) is screen printed (mesh size 120) with letters using an ink composition sold under the name Ovtek® Lg110606 Stellar by the company Tiflex (Poncin, France), and this is effected in a plurality of colours: blue/yellow, yellow/blue, green/red and red/green.

A marking film such as this is applied to each of the two surfaces of a stack of polycarbonate sheets, and the sheet assembly forming this stack is rolled in a press for hot rolling under pressure as described in Example 1.

It is then possible to separate the two marking films by manual peeling. A data medium is obtained in the form of a card, the total thickness of which is equal to the sum of the thicknesses of the polycarbonate sheets used, decreased by about 10%. On its outer surfaces, this data medium has iridescent coloured patterns corresponding to those imprinted on the polyester film in vitrophany, which have been transferred to the outer surface of the data medium during hot rolling under pressure, as illustrated in FIG. 6. It is noted that simple scraping of the surface does not allow these patterns to be removed completely, the ink having penetrated into the thickness of the polycarbonate.

EXAMPLE 4

A matt transparent polyester film 100 μm thick sold under the name Arcophane® MTRXPL by the company NORMANDY COATING, (Argues la bataille, France; http://www.normandy-coating.com/fr/Les-produits/mates.html) is screen printed (mesh size 120) with letters using an ink composition formed by a varnish sold under the name LG 111104 by the company Tiflex (Poncin, France) and to a level of 30% by a composition of pigments which are photoluminescent under short-wave ultraviolet light sold under the name CD145 vert by the company Tiflex (Poncin, France).

A marking film such as this is applied to each of the two surfaces of a stack of polycarbonate sheets, and the sheet assembly forming this stack is rolled in a press for hot rolling under pressure as described in Example 1.

It is then possible to separate the two marking films by manual peeling. A data medium is obtained in the form of a card, the total thickness of which is equal to the sum of the thicknesses of the polycarbonate sheets used, decreased by about 10%. On its outer surfaces, this data medium has patterns which are photoluminescent under short-wave ultraviolet light corresponding to those imprinted on the polyester film in vitrophany, which have been transferred to the outer surface of the data medium during hot rolling under pressure, as illustrated in FIG. 6. It is noted that simple scraping of the surface does not allow these patterns to be removed completely, the ink having penetrated into the thickness of the polycarbonate.

EXAMPLE 5

A matt polyester film 75 μm thick, treated to enhance adherence and sold under the name STABIPHANE® MTDE by the company NORMANDY COATING, (Argues la bataille, France; http://www.normandy-coating.com/fr/Les-roduits/mates.html) is screen printed (mesh size 120) with letters as shown in FIG. 3 using a composition of ultraviolet-cured varnish sold under the name UV 391, Uvibond® range by the company SERICOL (Trappes, France), mixed at a level of 5% of an adhesion promoter sold under the name UV290 by the company VFP (Saint Christol les Alès, France). A reflecting metallised ink composition sold under the name 3Y2656 by the company Tiflex (Poncin, France) is then imprinted on this varnish (after curing of this varnish) by superimposition over the letters and the same pattern (same letters).

A marking film such as this is applied to each of the two surfaces of a stack of polycarbonate sheets, and the group of sheets forming this stack is rolled in a press for hot rolling under pressure as described in Example 1.

It is then possible to separate the two marking films by manual peeling. A data medium is obtained in the form of a card, the total thickness of which is equal to the sum of the thicknesses of the polycarbonate sheets used, decreased by about 10%. On its outer surfaces, this data medium has relief (recessed) patterns corresponding to the letters imprinted using the varnish, and covered by the reflecting metallised layer which has been transferred to the outer surface of the data medium during hot rolling under pressure. Excellent separation is found between the embossing varnish and the reflecting metallised ink, the latter having a high level of resistance to abrasion owing to the fact that it is located in recesses.

The invention can be varied in many ways with respect to the embodiments and variations described above and in the examples and illustrated in the figures. In particular, it is possible to use a marking film to carry out marking rolling of one or a plurality of thermoplastic layer(s) prior to the operation of hot rolling under pressure of the entire stack constituting the multi-layer data medium. Each thermoplastic layer thus previously marked is incorporated into the stack. It is also possible to use thermoplastic materials other than polycarbonate, e.g. PVC or the like. The invention applies to any multi-layer data medium of which at least one outer layer is of thermoplastic material and which is produced by hot-rolling under pressure, the nature of the various other layers constituting the stack used for this rolling not being significant, the stack being able to incorporate other layers of non-thermoplastic material, e.g. synthetic papers. The different variations can be combined, e.g. with a punching film bearing embossed relief patterns in vitrophany applied to a surface of the rolled stack, and a marking film bearing transferable inscriptions applied to the other surface of the stack, or with the same marking film bearing both embossed relief patterns in vitrophany and transferable inscriptions.

The invention claimed is:

1. A method for the production of a multi-layer data medium by hot rolling under pressure of a plurality of superimposed layers comprising at least one outer layer made of a least one thermoplastic material, said multi-layer data medium having security inscriptions,
the method comprising:
at least one marking film is selected:
suitable to being subjected to hot rolling under pressure, said hot rolling under pressure being marking rolling, with a layer to be marked, of thermoplastic material of said plurality of superimposed layers forming the data medium, said layer to be marked being covered with the marking film during said marking rolling,
comprising a contact surface, bearing inscriptions in reverse image printing corresponding to said security inscriptions and being suitable for marking said layer to be marked following marking rolling of the marking film and of said layer to be marked, said contact surface and said inscriptions in reverse image printing being in contact with said layer to be marked,
wherein said marking film has, as inscriptions in reverse image printing, relief patterns in reverse image printing corresponding to security inscriptions formed of relief patterns, and
wherein the marking film bears said relief patterns in reverse image printing formed by imprinting of a varnish on the contact surface, said contact surface and said varnish being selected so that said relief patterns in reverse image printing remain fixedly attached to the marking film after marking rolling and separation of the marking film from said layer to be marked, the relief patterns in reverse image printing being selected from among relief patterns imprinted on the contact surface with said varnish, and embossed relief patterns on the surface of a layer of said varnish imprinted on the contact surface,
the marking film being suitable for being separated from said layer to be marked after marking rolling, the security inscriptions being formed on said layer to be marked,
marking rolling of at least one layer to be marked covered with such a marking film is carried out, said inscriptions in reverse image printing being in contact with said layer to be marked,
the marking film is then separated from said layer to be marked, the latter having said security inscriptions.

2. The method according to claim 1, wherein the layer to be marked is an outermost layer of said plurality of superimposed layers, said outermost layer forming a free outermost surface of the multi-layer data medium, and wherein said marking rolling is said hot rolling under pressure of said plurality of superimposed layers, the marking film being placed in contact with the layer to be marked during hot rolling under pressure, said free outermost surface of said medium bearing said security inscriptions after said hot rolling under pressure.

3. The method according to claim 1, wherein marking rolling is carried out before said hot rolling under pressure of said plurality of superimposed layers, the layer to be marked being marked with said security inscriptions and integrated in said plurality of superimposed layers before said hot rolling under pressure of said plurality of superimposed layers.

4. The method according to claim 1, wherein said imprinting of varnish with an ultraviolet-drying varnish composition comprising at least one agent promoting adhesion of the varnish to said contact surface.

5. The method according to claim 1, wherein each layer of said plurality of superimposed layers is formed of at least one thermoplastic material selected from the group of polycarbonates, PVCs, synthetic papers, mixtures and associations thereof, and wherein a polyester marking film is selected.

6. A multi-layer data medium able to be obtained by the method according to claim 1, having security inscriptions, formed of a plurality of superimposed layers rolled with respect to each other, comprising at least one layer of at least one thermoplastic material, the multi-layer data medium comprising security inscriptions selected from among relief patterns having different levels of glossiness; holographic patterns; reflecting metallised patterns; and patterns which are photoluminescent under light radiation outside the visible range, each layer of said plurality of superimposed layers being formed by at least one thermoplastic material selected from the group of polycarbonates.

7. The multi-layer data medium according to claim 6, further comprising security inscriptions formed on at least one of its free outer surfaces.

8. An official document comprising a data medium according to claim 6.

9. The method according to claim 2, wherein a marking film is selected having, as inscriptions in reverse image printing, relief patterns in reverse image printing corresponding to security inscriptions formed of relief patterns.

10. The method according to claim 3, wherein a marking film is selected having, as inscriptions in reverse image printing, relief patterns in reverse image printing corresponding to security inscriptions formed of relief patterns.

11. The method according to claim 1, wherein the relief patterns in reverse image printing are selected from among relief patterns having at least two different surface conditions respectively corresponding to at least two different glossiness values of said security inscriptions, and relief patterns in reverse image printing suitable for forming at least one holographic pattern.

12. The method according to claim 4, wherein the relief patterns in reverse image printing are selected from among relief patterns having at least two different surface conditions respectively corresponding to at least two different glossiness values of said security inscriptions, and relief patterns in reverse image printing suitable for forming at least one holographic pattern.

13. A method for the production of a multi-layer data medium by hot rolling under pressure of a plurality of superimposed layers comprising at least one outer layer made of at least one thermoplastic material, said multi-layer medium having security inscriptions,
the method comprising:
at least one marking film is selected:
suitable to being subjected to hot rolling under pressure, said hot rolling under pressure being marking rolling, with a layer to be marked, of thermoplastic material of said plurality of superimposed layers forming the data medium, said layer to be marked being covered with the marking film during said marking rolling,
comprising a contact surface, bearing inscriptions in reverse image printing corresponding to said security inscriptions and being suitable for marking said layer to be marked following marking rolling of the marking film and of said layer to be marked, said contact surface and said inscriptions in reverse image printing being in contact with said layer to be marked,
said marking film has, as inscriptions in reverse image printing, relief patterns in reverse image printing corresponding to security inscriptions formed of relief patter
said marking film being suitable for being separated from said layer to be marked after marking rolling, the security inscriptions being formed on said layer to be marked,
marking rolling of at least one layer to be marked covered with such a marking film is carried out, said inscriptions in reverse image printing being in contact with said layer to be marked,
the marking film is then separated from said layer to be marked, the latter having said security inscriptions,
wherein the relief patterns in reverse image printing are selected from among relief patterns having at least two different surface conditions respectively corresponding to at least two different glossiness values of said security inscriptions, and relief patterns in reverse image printing suitable for forming at least one holographic pattern.

14. A method for the production of a multi-layer data medium by hot rolling under pressure of a plurality of superimposed layers comprising at least one outer layer made of a least one thermoplastic material, said multi-layer data medium having security inscriptions,
the method comprising:
at least one marking film is selected:
suitable to being subjected to hot rolling under pressure, said hot rolling under pressure being marking rolling, with a layer to be marked, of thermoplastic material of said plurality of superimposed layers forming the data medium, said layer to be marked being covered with the marking film during said marking rolling,
comprising a contact surface, bearing inscriptions in reverse image printing corresponding to said security inscriptions and being suitable for marking said layer to be marked following marking rolling of the marking film and of said layer to be marked, said contact surface and said inscriptions in reverse image printing being in contact with said layer to be marked,
suitable for being separated from said layer to be marked after marking rolling, the security inscriptions being formed on said layer to be marked,
marking rolling of at least one layer to be marked covered with such a marking film is carried out, said inscriptions in reverse image printing being in contact with said layer to be marked,
the marking film is then separated from said layer to be marked, the latter having said security inscriptions,
wherein the marking film is selected, having as inscriptions in reverse image printing, at least one varnish impression suitable for being transferred by said marking rolling to said layer to be marked, said transferred inscriptions in reverse image printing constituting said security inscriptions.

15. The method according to claim 14, wherein at least one varnish imprint is selected from among an imprint of a reflecting metallised varnish and an imprint of a varnish which is photoluminescent under illumination by light radiation outside the visible range.

16. A method for the production of a multi-layer data medium by hot rolling under pressure of a plurality of superimposed layers comprising at least one outer layer made of a least one thermoplastic material, said multi-layer data medium having security inscriptions,
the method comprising:
at least one marking film is selected:
suitable to being subjected to hot rolling under pressure, said hot rolling under pressure being marking rolling, with a layer to be marked, of thermoplastic material of said plurality of superimposed layers forming the data medium, said layer to be marked being covered with the marking film during said marking rolling, comprising a contact surface, bearing inscriptions in reverse image printing corresponding to said security inscriptions and being suitable for marking said layer to be marked following marking rolling of the marking film and of said layer to be marked, said contact surface and said inscriptions in reverse image printing being in contact with said layer to be marked, suitable for being separated from said layer to be marked after marking rolling, the security inscriptions being formed on said layer to be marked, marking rolling of at least one layer to be marked covered with such a marking film is carried out, said inscriptions in reverse image printing being in contact with said layer to be marked, the marking film is then separated from said layer to be marked, the latter having said security inscriptions, wherein the layer to be marked is an outermost layer of said plurality of superimposed layers, said outermost layer forming a free outermost surface of the multi-layer data medium, and wherein said marking rolling is said hot rolling under pressure of said plurality of superimposed layers, the marking film being placed in contact with the layer to be marked during hot rolling under pressure, said free outermost surface of said medium bearing said security inscriptions after said hot rolling under pressure and, wherein marking rolling is carried out before said hot rolling under pressure of said plurality of superimposed layers, the layer to be marked being marked with said security inscriptions and integrated in said plurality of superimposed layers before said hot rolling under pressure of said plurality of superimposed layers is carried out.

17. A method for the production of a multi-layer data medium by hot rolling under pressure of a plurality of superimposed layers comprising at least one outer layer made of a least one thermoplastic material, said multi-layer data medium having security inscriptions, the method comprising:

at least one marking film is selected:

suitable to being subjected to hot rolling under pressure, said hot rolling under pressure being marking rolling, with a layer to be marked, of thermoplastic material of said plurality of superimposed layers forming the data medium, said layer to be marked being covered with the marking film during said marking rolling, comprising a contact surface, bearing inscriptions in reverse image printing corresponding to said security inscriptions and being suitable for marking said layer to be marked following marking rolling of the marking film and of said layer to be marked, said contact surface and said inscriptions in reverse image printing being in contact with said layer to be marked, suitable for being separated from said layer to be marked after marking rolling, the security inscriptions being formed on said layer to be marked, marking rolling of at least one layer to be marked covered with such a marking film is carried out, said inscriptions in reverse image printing being in contact with said layer to be marked, the marking film is then separated from said layer to be marked, the latter having said security inscriptions, wherein the layer to be marked is an outermost layer of said plurality of superimposed layers, said outermost layer forming a free outermost surface of the multi-layer data medium, and wherein said marking rolling is said hot rolling under pressure of said plurality of superimposed layers, the marking film being placed in contact with the layer to be marked during hot rolling under pressure, said free outermost surface of said medium bearing said security inscriptions after said hot rolling under pressure and, wherein the marking film is selected, having as inscriptions in reverse image printing, at least one varnish impression suitable for being transferred by said marking rolling to said layer to be marked, said transferred inscriptions in reverse image printing constituting said security inscriptions.

18. A method for the production of a multi-layer data medium by hot rolling under pressure of a plurality of superimposed layers comprising at least one outer layer made of a least one thermoplastic material, said multi-layer data medium having security inscriptions, the method comprising:

at least one marking film is selected:

suitable to being subjected to hot rolling under pressure, said hot rolling under pressure being marking rolling, with a layer to be marked, of thermoplastic material of said plurality of superimposed layers forming the data medium, said layer to be marked being covered with the marking film during said marking rolling, comprising a contact surface, bearing inscriptions in reverse image printing corresponding to said security inscriptions and being suitable for marking said layer to be marked following marking rolling of the marking film and of said layer to be marked, said contact surface and said inscriptions in reverse image printing being in contact with said layer to be marked, suitable for being separated from said layer to be marked after marking rolling, the security inscriptions being formed on said layer to be marked, marking rolling of at least one layer to be marked covered with such a marking film is carried out, said inscriptions in reverse image printing being in contact with said layer to be marked, the marking film is then separated from said layer to be marked, the latter having said security inscriptions, wherein marking rolling is carried out before said hot rolling under pressure of said plurality of superimposed layers, the layer to be marked being marked with said security inscriptions and integrated in said plurality of superimposed layers before said hot rolling under pressure of said plurality of superimposed layers, and wherein the marking film is selected, having as inscriptions in reverse image printing, at least one varnish impression suitable for being transferred by said marking rolling to said layer to be marked, said transferred inscriptions in reverse image printing constituting said security inscriptions.

* * * * *

UNITED STATES PATENT AND TRADEMARK OFFICE
CERTIFICATE OF CORRECTION

PATENT NO. : 10,384,486 B2
APPLICATION NO. : 15/314684
DATED : August 20, 2019
INVENTOR(S) : Eric Philippe et al.

It is certified that error appears in the above-identified patent and that said Letters Patent is hereby corrected as shown below:

On the Title Page

1. In Item (72), under "Inventors", in Column 1, Line 1, delete "Eyguieres, (FR);" and insert -- Eyguières, (FR); --, therefor.

In the Drawings

2. In Fig. 1, Sheet 1 of 3, delete "FIG" and insert -- FIG. --, therefor at each occurrence throughout the figures.

In the Specification

3. In Column 1, Line 48, delete "of a" and insert -- of an --, therefor.
4. In Column 12, Line 38, delete "(Argues" and insert -- (Arques --, therefor.
5. In Column 13, Line 1, delete "(Argues" and insert -- (Arques --, therefor.

In the Claims

6. In Column 13, Line 59, in Claim 1, delete "a least" and insert -- at least --, therefor.
7. In Column 15, Line 63, in Claim 13, delete "patter" and insert -- patterns, --, therefor.
8. In Column 16, Line 18, in Claim 14, delete "a least" and insert -- at least --, therefor.

Signed and Sealed this
Seventh Day of January, 2020

Andrei Iancu
*Director of the United States Patent and Trademark Office*